Aug. 5, 1947.  J. B. HERRING  2,425,242
TOOL HOLDER
Filed April 5, 1944
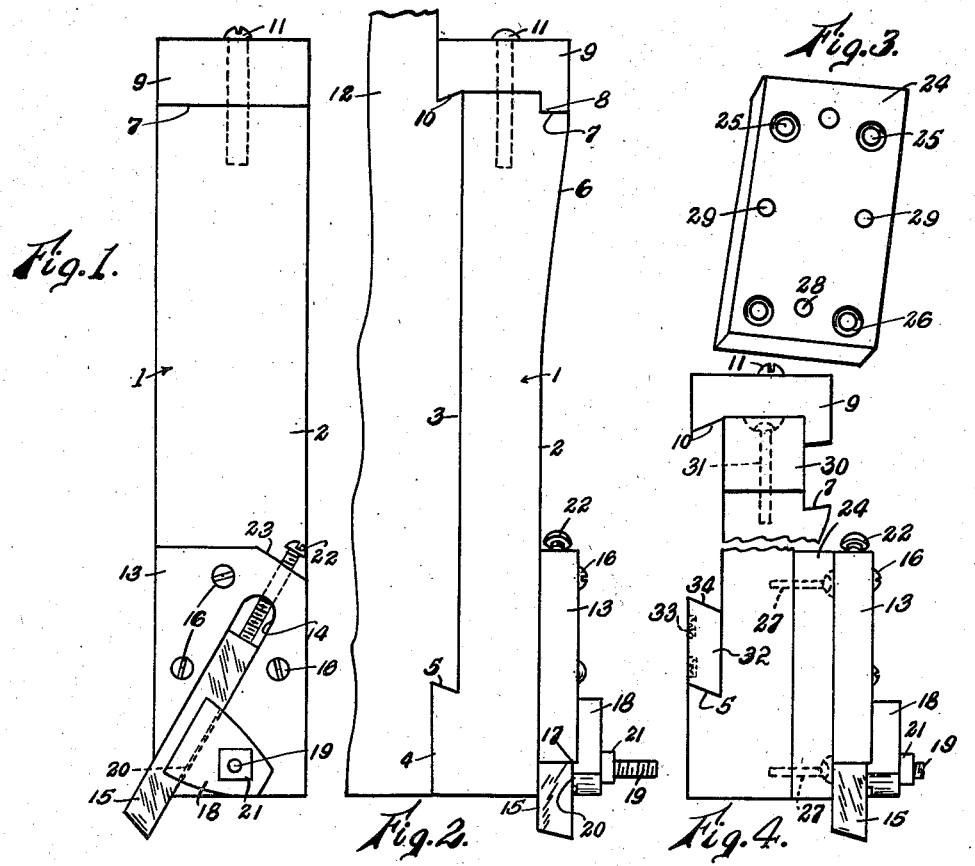
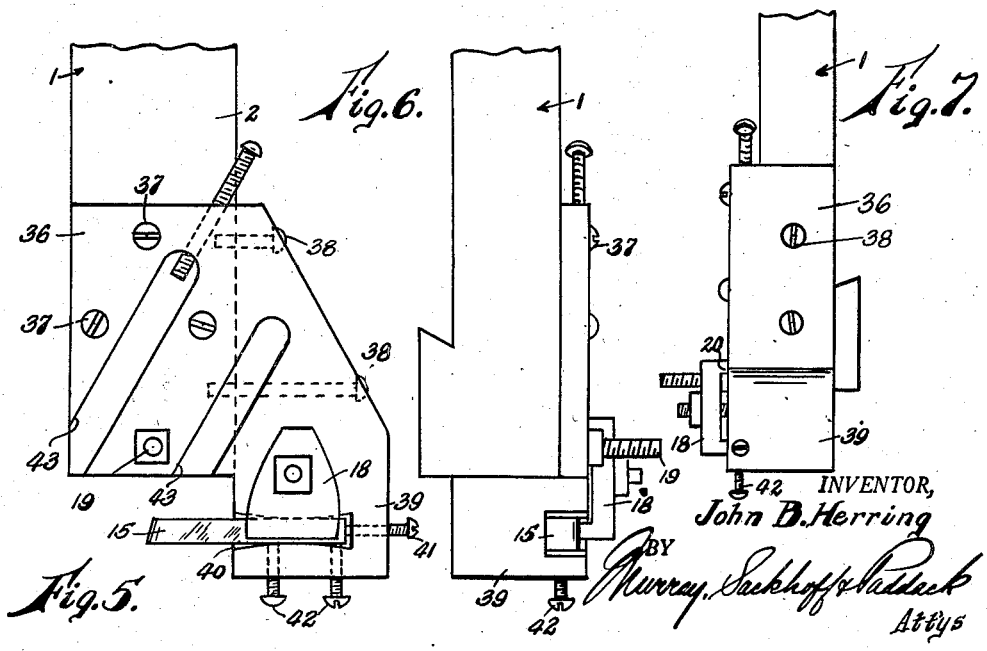
INVENTOR,
John B. Herring Patented Aug. 5, 1947

2,425,242

UNITED STATES PATENT OFFICE 2,425,242

TOOLHOLDER

John B. Herring, Covington, Ky.

Application April 5, 1944, Serial No. 529,582

6 Claims. (Cl. 29—96)

This invention relates to a tool holder of the type commonly employed in the connection with lathes and similar machines.

An object of the invention is to provide a tool holder of this kind so constructed as to be adjustable for the performance of various types of work.

Another object is to provide such a device which is adjustable in such a manner as to reverse the position of the tool by a simple operation and without the use of additional parts.

Another object is to provide a tool clamp or block which when positioned is locked against accidental displacement.

Another object is the provision of tool holders in which the tool engaging means are independent removable members.

Another object is the provision of means of the kind described which are simple and efficient in manufacture and in use.

These and other objects are attained by the means described herein and illustrated in the accompanying drawings in which:

Fig. 1 is a side elevational view of a tool holder of the present invention.

Fig. 2 is a front elevational view of the same, the supporting shoulders of a lathe or the like being shown partially and in operative association therewith.

Fig. 3 is a detail view of a supplemental block forming part of the invention.

Fig. 4 is a view similar to Fig. 2 with parts broken away, showing the use of the block depicted in Fig. 3 and also of certain other supplemental means forming part of the invention.

Figs. 5, 6 and 7, are respectively, a side, a front, and a rear elevational view of an undercut tool holder of the present invention, the upper part of the supporting body or shank being broken away.

Heretofore it has been necessary in connection with tool holders of the general type here under consideration, to provide a relatively large number of the holders in order that the set of holders might be complete for carrying out various kinds of work. For example, in connection with one type of vertical lathe, the tool holders comprising a complete set involve 7 different lengths and 12 different kinds of tool clamping members or grips making a total of 84 different and distinct tool holders. This not only represents a considerable investment and upkeep but likewise involves the time required to change from one tool holder to another of the set and the space for storing this somewhat elaborate set of tool holders.

The present invention obviates such difficulties by providing adjustable and reversible tool holders whereby the number of parts required to provide a complete set of tool holders is very materially reduced. Other advantages and novel details will become apparent in connection with the following description.

In greater detail and with reference to the drawings, the tool holder of this invention as seen in Figs. 1 and 2 may comprise a supporting body or shank 1 having an outside face 2 and an inside face 3, the lower end of the shank being formed outwardly as at 4 and provided as at 5 with an inwardly inclined connection shoulder.

At the top the shank may be flared outwardly as at 6 for added strength and the top end of the shank is preferably formed with a front shoulder 7 adapted to receive the downwardly projecting lug 8 of a connection block 9 seating on top of the shank. The block 9, at the rear, has a projecting under-shoulder 10 extending beyond the shank and adapted to cooperate with the lower shoulder 5. The block 9 is releasably secured to the top of the shank by means of a threaded bolt 11. It will be seen in Fig. 2 how the shoulders 5 and 10 are secured to the correspondingly formed shoulders of the supporting portions 12 of a lathe or the like.

The shank just described is adapted to support a tool holding member or block 13. This block is formed with a through-slot 14 for slidably receiving a cutting tool 15 or the like. The block 13 is provided with apertures for receiving the threaded bolts 16 by which the block is secured to the outside face 2 of the shank, at the lower end thereof, this end being formed with properly placed threaded apertures for receiving said bolts 16. The depth or thickness of the block 13 is such that when the tool 15 has been positioned in the slot 14, the upper or outside face of the cutting tool lies below the top of the slot, that is to say, below the outside face of the block 13, as indicated at 17. At this time the cutting tool lies against the face 2 of the shank and is clamped thereagainst. A threaded bolt 19 projects outwardly from face 2 of shank 1, at the bottom, the bolt passing freely through a suitable aperture provided in tool-holding block 13. Bolt 19 supports a clamp member 18 for binding tool 15 in position. Member 18 is provided with an aperture for freely receiving bolt 19, and on its lower face, is formed with a ridge 20 which projects down into the slot 14 and abuts the top or outer face of the cutting tool 15. The clamping member 18 is secured in place by means of a nut 21 receivable on the bolt 19. It will be seen that the ridge 20 precludes substantial turning and consequent displacement of the positioned clamping member by reason of the abutment of the said ridge against the adjacent wall of the slot 14. Member 18 is preferably formed with one of its ends of reduced width and, as seen in Fig. 7 this end may likewise be formed with a ridge on its under face thereby assuring firm frictional engagement of the clamping member against the tool holding block 13. In this fashion the cutting tool 15 is securely but removably positioned. Its projection from the lower end of the slot 14 may be controlled and predetermined by means of a threaded bolt 22 projecting into the upper end of the slot 14 from the adjacent edge of the block 13. For this purpose, the latter may be mitered as at 23 to provide a seat for the bolt 22.

The complete device as just described and as shown in Figs. 1 and 2 is adapted for making a right-side, outside cut or "O. D." (outside diameter), as used with the vertical type of lathe already referred to. For adapting the device to make an inside cut or "I. D." (inside diameter), the block 13 is removed and reversed, with the cutting tool extending to the right rather than, as seen in Fig. 1, to the left. Thereafter the threaded bolts 19, the clamping member 18 and the nut 21 are replaced, an operation requiring but a few moments. For making left-side cuts, both "O. D." and "I. D.," the present invention provides for the use of a supplemental block 24 shown in Figs. 3 and 4. This supplemental block may be of substantially the same size as the tool holding block 13 and is provided with perforations 25, counter-sunk at the top as at 26 whereby the block 24 may be secured as by bolts 27 in Fig. 4 to the shank or body 1. The block 24 is furthermore formed with an aperture 28 for receiving the bolt 19.

After the supplemental block has been secured to the shank, the tool holding block 13 is secured thereto, by means of the bolts 19, the supplemental block 24 being provided with proper openings 29 for threadedly receiving the said bolts. The cutting tool 15 is then disposed in the slot 14 and against the outer face of the supplemental block 24, the clamping member 18 being thereafter applied as already described.

The tool holder as thus modified, may be used for left-side cuts, the outside cut "O. D." being effected with the cutting tool pointing to the left, similarly to Fig. 1 and the inside cut "I. D." being effected with the tool pointing to the right.

In all of the four positions just outlined, the cutting tool may be used for a facing operation.

Fig. 4 likewise includes a showing of means for modifying the distance between the attachment shoulders 5 and 10 since the adjustability provided by the top bolt 11 may not be sufficient for attaching the tool holder to all supporting machines or lathes. For this purpose a top block 30 is provided in accordance with this invention for positioning on the upper end of the shank 1 by means of threaded bolts 31 passing through the block 30 into the top of the shank, the heads of the bolts being counter-sunk as shown, to avoid obstruction of the top face of block 30. On the upper face of this block, the connection block 9 is positioned, the bolt 11 passing threadedly into an aperture provided in the top block 30.

Alternatively, a lateral block 32 (Fig. 4) complementary with and seating upon the lower shoulder 5, may be provided. It is secured to the shank by suitable countersunk bolts 33 and is formed at the top with an inclined face 34 which forms a clamping shoulder cooperating with the shoulder 10 of the connection block 9.

The use of these blocks 30 and 32 also make it possible to lengthen the tool holder and lower the position of the cutting tool. In instances where it is desired to accomplish this result and at the same time maintain the same distance between the shoulders 10 and 34 as exists between shoulders 5 and 10, the supplemental blocks 30 and 32 are both used, the two being made, therefore, of substantially the same depth.

Figs. 5, 6 and 7 illustrate a tool holding member of this invention for use in under-cutting. The device comprises a main body 36 formed on one side with a vertical right angle cut-out for snugly engaging the outside face and rear edge of shank 1 at the bottom. Bolts 37 at the side and 38 at the rear may be employed for securing the tool-holding member to the shank.

An extension 39 on the main body 36 projects below the end of shank 1 and is formed with a tool receiving slot or groove 40, an adjustment bolt 41 entering the inner end of said groove for adjusting the amount of projection of the tool from the slot. Slot 40 may have its top and bottom walls curved as indicated for making possible fine angular adjustments of the cutting tool. Bottom bolts 42 may be provided, passing into the groove from the bottom into abutment against the positioned tool. On the outer face, the tool is gripped by means of the clamping member 18 in the same manner as described in connection with Figs. 1–4.

The main body section 36 may additionally be utilized for effecting additional cutting operation simultaneously with the undercut and for this purpose may be formed with one or more tool-receiving slots 43 to be utilized in the same manner as the slot 14 of Fig. 1. One or more additional grooves such as 43 may be provided for simultaneously performing cutting operations in addition to the undercut.

It is apparent that the adjustment and changes described may be effected in a minimum of time and by unskilled operators.

Variations will suggest themselves upon consideration of the means herein disposed but these are believed to be comprised within the spirit and scope of the invention.

What is claimed is:

1. A tool holder comprising a body, means for attaching the body to a machine, an independent clamp member comprising a block formed with a tool-receiving through slot, means for securing said block to a face of said body whereby a tool in said slot is disposed against such face, means for holding the tool in said slot, said block being reversible whereby the same tool and holder may be utilized for different operations, and a supplemental block for positioning between said body and said first block for further modifying the position of the tool for the performance of additional operations.

2. A tool-holding member comprising a body provided with a slot adapted to receive a tool and of such depth that the top surface of the positioned tool lies below the top of the slot, a clamp block having a ridge formed on a face thereof adapted to extend into said slot and lie against the positioned tool, and means for securing the clamp block to said body for holding the tool in place, said ridge being adapted to abut the top portions of the side walls of the slot to preclude displacement of the clamp block.

3. A tool holder comprising a body, means for adapting the body to a machine, an independent clamp member comprising a block having opposed faces lying in spaced, parallel planes and formed with a diagonal tool-receiving through slot, means for reversibly securing either face of the block to a face of said body, and a clamp member secured to the outer face of the block for holding a tool in the slot in face abutment with the said body face.

4. A tool holder comprising a body, means for adapting the body to a machine, an independent clamp member comprising a block having opposed faces lying in spaced, parallel planes and formed with a diagonal tool-receiving slot, means for reversibly securing either face of the block to a face of said body, and a clamp member secured to the outer face of the block for holding a tool in the slot.

5. A tool holder comprising a shank having a flat mounting face, an independent tool holding block having opposed faces lying in spaced, parallel planes and formed with a diagonal tool-receiving, through slot, means for adjustably securing the block to the shank with either of its faces in engagement with the mounting face of the shank, and a clamp member secured to the shank and held in abutment with the exposed faces of the block and the tool for holding said tool in the slot in face abutment with the mounting face of the shank when said block is in either of its adjusted positions.

6. In a device of the character described a tool, a shank having a flat mounting face, an independent tool holding block having opposed faces lying in spaced, parallel planes and formed with a diagonal tool-receiving, through slot, means for adjustably securing the block to the shank with either of its faces in engagement with the mounting face of the shank, and a clamp member secured to the shank and held in abutment with the exposed faces of the block and the tool for holding said tool in the slot in face abutment with the mounting face of the shank when said block is in either of its adjusted positions.

JOHN B. HERRING.

REFERENCES CITED

The following references are of record in the file of this patent:

UNITED STATES PATENTS

| Number | Name | Date |
|---|---|---|
| 861,768 | Remsberg | July 30, 1907 |
| 2,324,603 | Strobl | July 20, 1943 |
| 1,677,143 | Lange et al. | July 17, 1928 |
| 1,432,500 | Trosch | Oct. 17, 1922 |
| 714,942 | Normand | Dec. 2, 1902 |
| 2,254,056 | Anthony | Aug. 26, 1941 |
| 1,476,262 | Marshall | Dec. 4, 1923 |

FOREIGN PATENTS

| Number | Country | Date |
|---|---|---|
| 428,789 | Great Britain | May 20, 1935 |
| 658,285 | France | June 3, 1929 |